United States Patent
Kelly et al.

(10) Patent No.: US 10,221,266 B2
(45) Date of Patent: Mar. 5, 2019

(54) SHORT CHAIN BRANCHING CONTROL ON ETHYLENE-BUTENE COPOLYMERS

(71) Applicant: NOVA Chemicals (International) S.A., Fribourg (CH)

(72) Inventors: Mark Kelly, Airdrie (CA); Shivendra Kumar Goyal, Calgary (CA); James Joseph McEachern, Red Deer (CA)

(73) Assignee: NOVA Chemicals (International) S.A., Fribourg (CH)

( * ) Notice: Subject to any disclaimer, the term of this patent is extended or adjusted under 35 U.S.C. 154(b) by 114 days.

(21) Appl. No.: 15/317,003

(22) PCT Filed: May 12, 2015

(86) PCT No.: PCT/IB2015/053499
§ 371 (c)(1),
(2) Date: Dec. 7, 2016

(87) PCT Pub. No.: WO2015/189725
PCT Pub. Date: Dec. 17, 2015

(65) Prior Publication Data
US 2018/0208692 A1    Jul. 26, 2018

(30) Foreign Application Priority Data
Jun. 13, 2014 (CA) ................... 2854224

(51) Int. Cl.
*C08F 210/06*    (2006.01)
*C08F 210/08*    (2006.01)
(Continued)

(52) U.S. Cl.
CPC ............ *C08F 210/16* (2013.01); *A63C 5/056* (2013.01); *C08F 2/34* (2013.01); *C08F 4/655* (2013.01);
(Continued)

(58) Field of Classification Search
None
See application file for complete search history.

(56) References Cited

U.S. PATENT DOCUMENTS 3,779,712 A    12/1973    Calvert et al.
4,302,506 A    11/1981    Heberger
(Continued)

FOREIGN PATENT DOCUMENTS

CA    2 397 401 C    2/2003

OTHER PUBLICATIONS

Peri, J.B. and Hensley, A.L., Jr.; The Surface Structure of Silica Gel; The Journal of Physical Chemistry; vol. 72, No. 8, Aug. 1968; pp. 2926-2933.
(Continued)

*Primary Examiner* — Catherine S Branch
(74) *Attorney, Agent, or Firm* — Julie L. Heinrich

(57) ABSTRACT

A method is provided to control the short chain branching (SCB) distribution of an ethylene-butene (EB) polyethylene resin that is prepared in a gas phase polymerization process using a specific type of magnesium-titanium Ziegler Natta catalyst. The method allows the level of short chain branching to be increased in the low molecular weight fraction of the resin by increasing the polymerization residence time. The polymers that are produced in accordance with this invention may be useful for the preparation of cast films and blown films, especially for stretch film applications.

19 Claims, 2 Drawing Sheets

(51) Int. Cl.

| | |
|---|---|
| *C08F 4/655* | (2006.01) |
| *C08F 2/34* | (2006.01) |
| *C08F 210/16* | (2006.01) |
| *A63C 5/056* | (2006.01) |

(52) U.S. Cl.
CPC ........ *C08F 210/08* (2013.01); *C08F 2500/08* (2013.01); *C08F 2500/10* (2013.01)

(56) References Cited

U.S. PATENT DOCUMENTS

| | | |
|---|---|---|
| 4,302,566 A | 11/1981 | Karol et al. |
| 4,302,586 A | 11/1981 | Fletcher |
| 4,543,399 A | 9/1985 | Jenkins, III et al. |
| 4,588,790 A | 5/1986 | Jenkins, III et al. |
| 4,719,193 A | 1/1988 | Levine et al. |
| 5,352,749 A | 10/1994 | DeChellis et al. |
| 5,436,304 A | 7/1995 | Griffin et al. |
| 6,046,126 A | 4/2000 | Kelly et al. |
| 6,140,264 A | 10/2000 | Kelly et al. |
| 7,211,353 B2 | 5/2007 | Kashida et al. |
| 7,211,535 B2 | 5/2007 | Kelly et al. |
| 2006/0094838 A1* | 5/2006 | Kelly .................... C08F 10/00 526/124.3 |

OTHER PUBLICATIONS

Xie, Tuyu; McAuley, Kim B., Hsu, James C.C. and Bacon, David W.; Gas Phase Ethylene Polymerization: Production Processes, Polymer Properties, and Reactor Modeling; Ind. Eng. Chem. Res. (1994), vol. 33, No. 3, pp. 449-479.

Noshay, A. and Karol, F.J.; Transition Metal Catalyzed Polymerizations; Ziegler-Natta and Metathesis Polymerizations; Chemical Activation of Silica Supports for Chromocene-Based Polyethylene Catalysts; edited by Roderic P. Quirk; Copyright 1988; p. 396.

ASTM D 792-00; Standard Test Methods for Density and Specific Gravity (Relative Density) of Plastics by Displacement; Current edition approved Dec. 10, 2000. Published Mar. 2001. Originally published as D 792-44. pp. 1-6.

ASTM D 1238-04; Standard Test Method for Melt Flow Rates of Thermoplastics by Extrusion Plastometer; Current edition approved Mar. 1, 2004. Published Apr. 2004. Originally approved in 1965. Last previous edition approved in 2001 as D 1238-01. pp. 1-13.

\* cited by examiner

SHORT CHAIN BRANCHING CONTROL ON ETHYLENE-BUTENE COPOLYMERS

TECHNICAL FIELD

This invention generally relates to a gas phase process for the polymerization of ethylene-butene resins using a magnesium-titanium type of Ziegler Natta catalyst.

BACKGROUND ART

Ziegler-Natta type catalysts are well known and have been used since the early 1950's. Generally, the catalyst comprises a transition metal compound, typically titanium in the 3 or 4 valence state (e.g. $TiCl_3$ or $TiCl_4$) supported on magnesium chloride.

Some prior art catalysts are prepared by using an electron donor (ED), to dissolve the $MgCl_2$ and $TiCl_3$. When supported on silica, and placed in a gas phase reactor with at least one co-catalyst, typically an aluminum compound such as a trialkyl aluminum (e.g. triethylaluminum (TEAL)) or an alkyl aluminum halide (e.g. diethylaluminum chloride (DEAC)) this combination makes a good catalyst for the polymerization of polyethylene. The ED used as the solvent in the formulation tends to narrow the molecular weight distribution in the resulting polymer. As the ED is difficult to remove, polymers having a broader MWD are difficult to manufacture using this catalyst synthesis process. Also, as the ED must be capable of dissolving the $MgCl_2$ and $TiCl_3$, the choice of the electron donor is limited. A good description of these types of catalysts is contained in U.S. Pat. No. 4,302,566 issued Nov. 24, 1981 to Karol et al., assigned to Union Carbide Corporation. The Karol '566 patent also discloses the preparation of ethylene-butene copolymers in a gas phase polymerization process using the catalysts. The resulting ethylene-butene copolymers are a mixture of three different types of polymer fractions, namely a first fraction that is characterized by having a high molecular weight and having little or no butene comonomer; a second fraction of intermediate molecular weight and an intermediate level of butene comonomer; and a third fraction having a low molecular weight and a comparatively high amount of comonomer. In addition, there is a fourth typical feature of these copolymers, namely that the second fraction (i.e. the fraction having an intermediate molecular weight and intermediate level of comonomer) has a non uniform level of butene incorporation. In particular, the number of short chain branches—or "SCB" that result from the incorporation of the butene comomomer—decreases as the molecular weight increases. These ethylene-butene copolymers have enjoyed wide spread commercial success for more than 30 years. Several billion pounds of these copolymers are still being sold every year. For convenience, this type of product is referred to herein as a "Conventional Butene Resin".

More recently, NOVA Chemicals Ltd. U.S. Pat. No. 6,140,264 issued Oct. 31, 2000 and U.S. Pat. No. 6,046,126 issued Apr. 4, 2000 to Kelly et al., both deal with making a $TiCl_4$ supported catalyst on magnesium chloride (precipitated from a dialkyl magnesium compound and an organic halide) which is on a thermally and chemically treated silica. The technology used to synthesize such catalysts was further advanced in the manner disclosed in U.S. Pat. No. 7,211,535 (Kelly et al.). The catalysts disclosed in the Kelly '535 patent are highly active for the preparation of both ethylene-hexene copolymers and ethylene-butene copolymers in a gas phase polymerization process. The ethylene-butene copolymers that are normally produced with these catalysts (i.e. when using standard/conventional operating conditions in the gas phase process) are somewhat different from the Conventional Butene Resins described above. In particular, "new" ethylene butene resins that are normally produced with these catalysts are different from Conventional Butene Resins in two respects:

a) there is more comonomer in the very low molecular weight fraction of the Conventional Butene resins; and b) the comonomer content/SCB distribution of the "new" resins is more uniform in the fraction of intermediate molecular weight.

These new resins have also enjoyed great commercial success, with hundreds of millions of pounds being sold each year since 2006. The new resins are generally considered to be an improved product (as both of the differences in resin architecture tend to provide some advantages for most customers). However, there is still a large market demand for Conventional Butene Resins.

We have now discovered a process that allows the production of the old Conventional Butene Resins using the new Kelly et al. catalysts. Thus, the same reactor may be used to produce both of the "new" resins and the conventional butene resins by operating the reactor under different conditions.

DISCLOSURE OF INVENTION

In one embodiment, the present invention provides: a method to control the short chain branching distribution of a thermoplastic ethylene-butene copolymer having a density of from 0.910 to 0.935 g/cc, said method comprising:

1) establishing a first steady state gas phase polymerization condition wherein a gaseous monomer mixture be comprising from 5 to 35 mole % butene and, to 100 mole %, from 95 to 65 mole % ethylene, is contacted with a supported polymerization catalyst in a gas phase polymerization reactor at a pressure of from 10 to 500 psi; a temperature of from 50 to 125° C. and a first reaction residence time;

2) establishing a second steady state gas phase polymerization condition under which:

2.1) said gaseous monomer mixture is essentially the same as said first polymerization condition;

2.2) said supported polymerization catalyst is essentially the same, as used in said first polymerization condition; and 2.3) a second residence time is employed, wherein said second residence time is greater than the first residence time;

wherein the short chain branching content of the ethylene-butene copolymer prepared under said second polymerization condition is different from the short chain branching content of the ethylene-butene copolymer prepared under said first polymerization condition, characterized in that the low molecular fraction of the ethylene butene copolymer produced under said second polymerization condition has a higher short chain branch content than ethylene butene copolymer that is produced under said first polymerization condition and wherein said polymerization catalyst is prepared according to a process comprising contacting at a temperature from 0° C. to 100° C. a support which has been heat treated to remove adsorbed water and having a residual surface hydroxyl content from 0.1 to 5 mmol/g of support, which support has been subsequently treated with an aluminum compound reactive with the surface hydroxyl groups to provide from 0.5 to 2.5 wt % Al on the support, in an inert hydrocarbyl solvent or diluent with or without isolation of the treated support from the hydrocarbyl solvent or diluent with: a transition metal compound, a magnesium halide, prepared by reacting in situ an alkyl magnesium compound of the formula $(R^5)_e Mg X_{2-e}$ wherein each $R^5$ is independently a $C_{1-8}$ alkyl radical and e is 1 or 2 and X is a chlorine or bromine atom; with a reactive organic halide selected from the group consisting of $CCl_4$ and $C_{1-6}$ alkyl halides and mixtures thereof, a second aluminum alkyl compound and optionally an electron donor and separating the resulting catalyst from the inert hydrocarbyl solvent or diluent provided that the order of reagent addition to the support meets the following conditions:

(i) the transition metal compound cannot be added first;

(ii) when the Mg compound is added first, the transition metal compound cannot be added second;

(iii) when the second aluminum alkyl is added first, the transition metal compound cannot be added second;

(iv) when the Mg compound and the second aluminum alkyl compound are added first and second, in any order, the transition metal compound cannot be added third;

(v) the transitional metal compound must be added after the reactive organic halide;

(vi) the transition metal compound must be added after the alkyl magnesium compound;

(vii) the electron donor, if present, cannot be added last;

(viii) the reactive organic halide cannot be added last;

(ix) if the reactive organic halide is first the second aluminum alkyl compound cannot be second;

(x) if the second aluminum alkyl compound is first the reactive organic halide cannot be second; and (xi) when the transition metal is last, the second aluminum alkyl and Mg compounds cannot be third or fourth, in any order.

The catalyst productivity is preferably greater than 1,500 g of polymer per gram of catalyst under standard gas phase commercial plant operations typically used in a gas phase process to manufacture a 1 MI ethylene butene copolymer having a density of 0.918 g/cc.

In accordance with some preferred aspects of the present invention there is provided component loading ratios of: a molar ratio of total aluminum to Ti from 2:1 to 15:1, preferably from 4:1 to 10:1; a molar ratio Al from the second alkyl aluminum ($Al^2$) to Ti from 1:1 to 8:1; a molar ratio of Mg:Ti from 1:1 to 20:1, preferably from 2:1 to 12:1, most preferred from 3:1 to 10:1; a molar ratio of active halide from the reactive organic halide to Mg from 1:1 to 6:1, preferably from 1.5:1 to 5:1; and a molar ratio of electron donor to Ti from 0:1 to 18:1, preferably from 0.5:1 to 15:1; said catalyst being co-catalyzed with a co-catalyst selected from the group consisting of tri $C_{1-8}$ alkyl aluminums, alkyl aluminum chlorides (e.g. di $C_{1-8}$ alkyl aluminum chloride), and mixtures thereof, preferably in an amount to provide from 10 to 50 ppm of aluminum from the co-catalyst based on the polymer production rate.

BEST MODE FOR CARRYING OUT THE INVENTION

Figure 1:
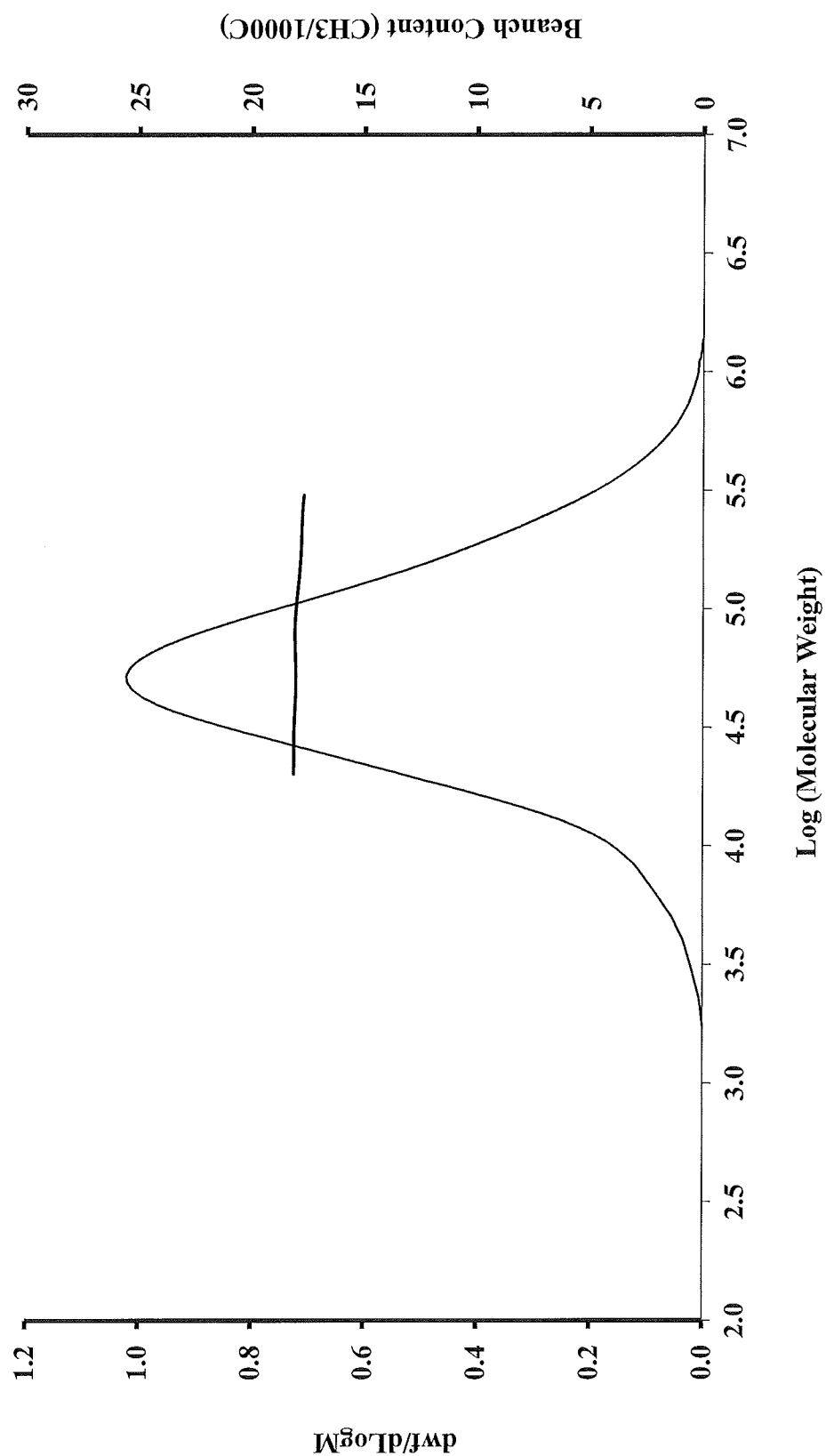
FIG. 1 is a plot of the short chain branching (SCB) distribution of an ethylene-butene resin that is prepared using a catalyst prepared according to the disclosure of U.S. Pat. No. 7,211,535 (Kelly et al.).

FIG. 1 represents a typical SCB distribution of an ethylene-butene resin that is prepared using a catalyst of the type disclosed in U.S. Pat. No. (7,211,535 Kelly et al.) and under reactor conditions that are optimized (minimized) to provide maximum reactor productivity. These resins have been sold in large commercial quantities since 2006. As shown in FIG. 1, the level of SCB is quite flat between molecular weights of about 30,000 to 300,000.

Figure 2:
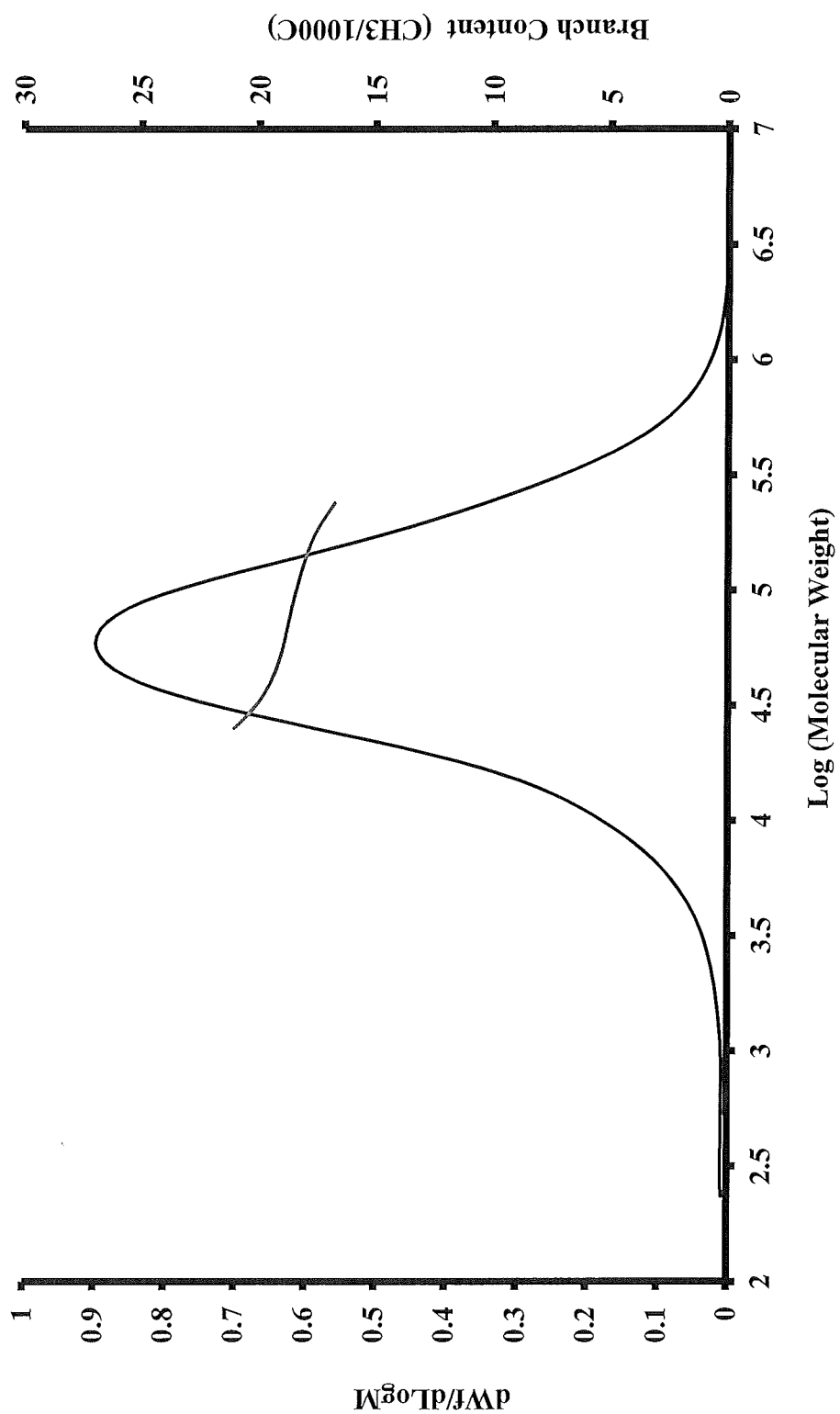
FIG. 2 is a plot of the SCB distribution of an ethylene-butene resin that is prepared according to the method of this invention.

A series of polymerizations were conducted at (or near) the optimum/minimum residence time to produce this polymer. The optimum (minimum) residence time was observed to be about 1.4 hours (where residence time is calculated by dividing the bed weight (in kilos) by the production rate (kilos per hour)). For small scale polymerizations, the bed weight may be directly measured with a scale or load cell and for commercial reactors the bed weight may be estimated using pressure drop measurements (and techniques that are well known to those skilled in the art). Small deviations from the minimum/optimum residence time (about 10% or less) did not produce meaningful differences in the SCB of the ethylene-butene resins. However, when the residence time was increased by about 15%-20% over the optimum residence time (to 1.6 hours), the SCB distribution was observed to significantly change. FIG. 2 shows the SCB of an ethylene-butene resin produced at about 20% longer residence time (and in accordance with the present invention). A comparison of FIG. 2 and FIG. 1 shows that the ethylene-butene resin that are produced in accordance with the present invention have a larger amount of SCB at low molecular weight and that the SCB shows a downward slope as the molecular weight increases from about 30,000 to 300,000. This type of SCB distribution is typical of the aforementioned Conventional Butene Resins (such as those prepared in accordance with U.S. Pat. No. 4,302,506; Karol et al.). These Conventional Butene Resins can be "sticky" in comparison to the resins of FIG. 1. This stickiness may be desirable for some film applications such as "stretch" or "cling" wrap.

Thus, the prior art process allows for the preparation of the "new" butene resins (illustrated by FIG. 1) with the catalyst of U.S. Pat. No. 7,211,353. The present invention allows the preparation of the old "Conventional Butene Resins" using the same catalyst and the same reactor by simply increasing the reactor residence time.

The process of this invention is sub optimal from the perspective of maximizing reactor productivity. However, in exchange for lower productivity when making the Conventional Butene Resins, the present invention allows a broader product range to be manufactured using the same type of catalyst in the same gas phase reactor.

As a general guideline, the residence time should be increased by (about) 15-20% or more (in comparison to the minimum/optimum) in order to produce the desired effect. The precise amount of extra residence time may be readily determined by persons skilled in the art using simple and conventional experimental techniques—especially if the experiments are started at an increased residence time of 15%.

In this specification the term MI means melt index (or $I_2$). The MI is determined according to ASTM D 1238-04 at condition 190/2.16 (at 190° C. and under a weight of 2.16 Kg.).

In this specification density (g/cc or kg/m³) means the density determined according to ASTM D 792-00.

In this specification and claims the terms catalyst and catalyst precursor are used interchangeably as some may consider the catalyst the species activated with the co-catalyst. The term catalyst and catalyst precursor are meant to mean the supported composition before further reaction with the activator, typically a tri $C_{1-8}$, preferably $C_{2-6}$, most preferably $C_{2-4}$ alkly aluminum or $C_{1-8}$, preferably $C_{2-6}$ most preferably $C_{2-4}$ alkyl aluminum halide in the reactor. The catalyst or catalyst precursor may be pre polymerized prior to introduction into the reactor. Typically the pre polymer contains from about 5 to 20, typically 5 to 15 weight % of supported catalyst.

The gas phase and particularly the fluidized bed gas phase polymerization of ethylene polymers has been known for some time. A broad general description of these types of processes is set out in the paper "Gas Phase Ethylene Polymerization: Production Processes, Polymer Properties, and Reactor Modeling", by Tuyu Xie, Kim B. McAuley, James C. C. Hsu, and David W. Bacon, Ind. Eng. Chem. Res. 1994, 33, 449-479. The method of this invention is generally suitable for use in any size of gas phase reactor, including the recently introduced reactors that have volumes of greater than 250 cubic meters.

Generally, a monomer feed comprising at least ethylene and optionally one or more $C_{3-8}$ alpha-olefins is fed to a gas phase fluidized bed or stirred bed reactor. The monomer mixture optionally together with hydrogen and/or an inert gas are fed to the fluidized bed. In a fluidized bed reactor, the velocity of the gas is sufficient to suspend the bed in the fluid flow of monomer and other components. In a stirred bed reactor mechanical agitation serves to help suspend the bed. Generally a fluid bed reactor is vertical and a stirred bed reactor is horizontal. Concurrently with the monomers a co-catalyst and a supported catalyst are fed to the bed. The monomer passing over the catalyst, polymerizes on the catalyst and in the pores of the catalyst, causing the particle to increase in size and to break. The resulting polymer particle continues to grow as it resides in the reactor. In a stirred tank reactor the bed is stirred to a discharge section and leaves the reactor. In a fluidized bed the reactor typically has a narrower section to keep the fluid (gas) velocity sufficiently high to fluidize the bed. There is an expanded zone at the top of the reactor to reduce the speed of the gas passing through the reactor so the polymer/catalyst particles fall back into the bed. The discharge is from the bed zone in the reactor.

In both the fluidized bed and stirred bed the polymer particles removed from the reactor are degassed to remove any volatile material and the resulting polymer (with entrained catalyst) may then be further treated (e.g. stabilizers added and pelletized if necessary).

Ziegler-Natta catalysts are used in the gas phase polymerization of ethylene. Typically, the catalysts comprise a support, a magnesium compound (optionally in the presence of a halide donor to precipitate magnesium halide), a titanium compound and an aluminum compound, in the presence of an electron donor. The aluminum compound is added at different stages. It is added to the support to chemically treat it (i.e. $Al^1$) and it is added at some point during the manufacture of the catalyst (i.e. $Al^2$).

The support for the catalysts useful in the present invention typically comprises an inorganic substrate usually of alumina or silica having a pendant reactive moiety. The reactive moiety may be a siloxy radical or more typically is a hydroxyl radical. The preferred support is silica. The support should have an average particle size from about 0.1 to 150 microns, typically from 10 to 150 microns, preferably from about 20 to 100 microns. The support should have a large surface area typically greater than about 100 m²/g, preferably greater than about 250 m²/g, most preferably from 300 m²/g to 1,000 m²/g. The support may be porous and may have a pore volume from about 0.3 to 5.0 ml/g, typically from 0.5 to 3.0 ml/g. Supports which are specifically designed to be an agglomeration of sub-particles while useful, are not required.

The support can be heat treated and/or chemically treated to reduce the level of surface hydroxyl (OH) groups in a similar fashion to that described by A. Noshay and F. J. Karol in *Transition Metal Catalyzed Polymerizations*, Ed. R. Quirk, 1989, pg. 396. After treatment the support may be put into a mixing vessel and slurried with an inert solvent or diluent preferably a hydrocarbon and contacted with or without isolation or separation from the solvent or diluent of the catalyst components.

It is important that the support be dried prior to the initial reaction with an aluminum compound. Generally, the support may be heated at a temperature of at least 200° C. for up to 24 hours, typically at a temperature from 500° C. to 800° C. for about 2 to 20, preferably 4 to 10 hours. The resulting support will be free of adsorbed water and should have a surface hydroxyl content from about 0.1 to 5 mmol/g of support, preferably from 0.5 to 3 mmol/g.

A silica suitable for use in the present invention has a high surface area and is amorphous. For example, commercially available silicas are marketed under the trademark of Sylopol® 958 and 955 by Davison Catalysts a Division of W. R. Grace and Company and ES-70W by PQ Corporation.

The amount of the hydroxyl groups in silica may be determined according to the method disclosed by J. B. Peri and A. L. Hensley, Jr., in *J. Phys. Chem.*, 72 (8), 2926, 1968, the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound (e.g. triethyl aluminum) or a silane compound. This method of treatment has been disclosed in the literature and two relevant examples are: U.S. Pat. No. 4,719,193 to Levine in 1988 and by Noshay A. and Karol F. J. in *Transition Metal Catalyzed Polymerizations*, Ed. R. Quirk, 396, 1989. For example the support may be treated with an aluminum compound of the formula $R^1{}_bAl(OR^1)_aX_{3-(a+b)}$ wherein a is an integer from 0 to 3, b is an integer from 0 to 3 and the sum of a+b is from 0 to 3, $R^1$ is the same or different $C_{1-10}$ alkyl radical and X is a chlorine atom. The amount of aluminum compound is such that the amount of aluminum on the support prior to adding the remaining catalyst components will be from about 0.5 to 2.5 weight %, preferably from 1.0 to 2.0 weight % based on the weight of the support. The remaining aluminum content is added as a subsequent or second component of the catalyst (e.g. $Al^2$). The first and second aluminum compounds may be the same or different. If the first and second aluminum compounds are the same the electron donor is preferably present.

Typically the Ziegler-Natta catalyst useful in accordance with the present invention will comprise an aluminum compound of the formula $R^1{}_bAl(OR^1)_aX_{3-(a+b)}$ wherein a is an integer from 0 to 3, b is an integer from 0 to 3 and the sum of a+b is from 0 to 3, $R^1$ is the same or different $C_{1-10}$ alkyl radical and X is a chlorine atom, a titanium compound of the formula $Ti(OR^2)_cX_d$ wherein $R^2$ is selected from the group consisting of a $C_{1-4}$ alkyl radical, a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom; a magnesium compound of the formula $(R^5)_eMgX_{2-e}$ wherein each $R^5$ is independently a $C_{1-8}$ alkyl radical and e is 1 or 2; a reactive organic halide selected from the group consisting of $CCl_4$ and $C_{1-6}$ alkyl halides preferably $C_{3-6}$ secondary and tertiary alkyl halides, preferably chlorides or a mixture thereof and optionally an electron donor, a molar ratio of total Al to Ti (e.g. the first and second aluminum additions $Al^1$ and $Al^2$—typically from 0 to 70 weight % of the aluminum compound is used to treat the support and the remaining aluminum is added at some time during the rest of the catalyst synthesis) from 2:1 to 15:1 a molar ratio of Al from the second aluminum ($Al^2$) addition to Ti from 1:1 to 8:1; a molar ratio of Mg:Ti from 1:1 to 20:1, preferably 2:1 to 12:1; a molar ratio of active halide (this excludes the halide from the Al and Ti compounds if present) from the $CCl_4$ or $C_{1-6}$ preferably $C_{3-6}$ alkyl halide or mixtures thereof to Mg from 1:1 to 6:1, preferably 1.5:1 to 5:1; and a molar ratio of electron donor to Ti from 0:1 to 18:1, preferably from 0.5:1 to 15:1.

Typically the catalyst components are reacted in an organic medium such as an inert $C_{5-10}$ hydrocarbon that may be unsubstituted or is substituted by a $C_{1-4}$ alkyl radical. Some solvents include pentane, isopentane, hexane, isohexane, heptane, octane, cyclohexane, methyl cyclohexane, hydrogenated naphtha and ISOPAR®E (a solvent available from Exxon Chemical Company) and mixtures thereof.

Typically the aluminum compounds useful in the formation of the catalyst or catalyst precursor in accordance with the present invention have the formula $R^1{}_b Al(OR^1)_a X_{3-(a+b)}$ wherein a is an integer from 0 to 3, preferably 0 or 1, b is an integer from 0 to 3 preferably 2 or 3 most preferably 3, and the sum of a+b is from 0 to 3 preferably 3, $R^1$ is the same or different $C_{1-10}$, preferably a $C_{1-8}$ alkyl radical and X is a halogen atom preferably a chlorine atom. Suitable aluminum compounds include, trimethyl aluminum (TMA), triethyl aluminum (TEAL), diethyl aluminum ethoxide, diisobutyl aluminum ethoxide, isoprenyl aluminum, tri-isobutyl aluminum (TiBAL), diethyl aluminum chloride (DEAC), tri-n-hexyl aluminum (TnHAl), tri-n-octyl aluminum (TnOAl), and mixtures thereof. The aluminum compounds containing a halide may be an aluminum sesqui-halide. Preferably, in the aluminum compound a is 0, b is 3 and $R^1$ is a $C_{1-8}$ alkyl radical.

The magnesium compound may be a compound of the formula $(R^5)_e MgX_{2-e}$ wherein each $R^5$ is independently a $C_{1-8}$ alkyl radical and e is 1 or 2. Some commercially available magnesium compounds include magnesium chloride, butyl octyl magnesium, dibutyl magnesium and butyl ethyl magnesium. If the magnesium compound is soluble in the organic solvent it may be used in conjunction with a $C_{3-6}$ halogenating agent or reactive organic halide to form magnesium halide (i.e. $MgX_2$ where X is a halogen preferably chlorine or bromine, most preferably chlorine), which precipitates from the solution (potentially forming a substrate for the Ti compound).

Some halogenating agents (e.g. reactive organic halides) include $CCl_4$ or one or more secondary or tertiary halides, preferably chlorides, of the formula $R^6Cl$ wherein $R^6$ is selected from the group consisting of $C_{1-6}$ alkyl radicals preferably secondary and tertiary $C_{3-6}$ alkyl radicals. Suitable chlorides include sec-butyl chloride, t-butyl chloride and sec-propyl chloride. The reactive halide is added to the catalyst in a quantity such that the molar ratio of active halide (e.g. chloride from the reactive organic halide):Mg should be from 1:1 to 6:1, preferably 1.5:1 to 5:1, more preferably from 1.5:1 to 3:1 and most preferred from 1.9:1 to 3:1.

The titanium compound in the catalyst has the formula $Ti(OR^2)_c X_d$ wherein $R^2$ is selected from the group consisting of a $C_{1-4}$ alkyl radical, and a $C_{6-10}$ aromatic radical, X is selected from the group consisting of a chlorine atom and a bromine atom preferably chlorine, c is 0 or an integer up to 4 and d is 0 or an integer up to 4 and the sum of c+d is the valence of the Ti atom. The titanium compound may be selected from the group consisting of $TiCl_3$, $TiCl_4$, $Ti(OC_4H_9)_4$, $Ti(OC_3H_7)_4$, and $Ti(OC_4H_9)Cl_3$. Most preferably the titanium compound is selected from the group consisting of $Ti(OC_4H_9)_4$ and $TiCl_4$ and mixtures thereof. Generally, the titanium in the catalyst or catalyst precursor is present in an amount from 0.20 to 3, preferably from 0.20 to 1.5, most preferably from 0.25 to 1.0 weight % based on the final weight of the catalyst (including the support).

As noted above, an electron donor may be and in fact is preferably used in the catalysts or catalysts precursor used in accordance with the present invention. The electron donor may be selected from the group consisting of $C_{3-18}$ linear or cyclic aliphatic or aromatic ethers, ketones, esters, aldehydes, amides, nitriles, amines, phosphines or siloxanes. Preferably, the electron donor is selected from the group consisting of diethyl ether, triethyl amine, 1,4-dioxane, tetrahydrofuran, acetone, ethyl acetate, and cyclohexanone and mixtures thereof. The electron donor when present may be used in a molar ratio to the titanium from 0.5:1 to 18:1 preferably in a molar ratio to Ti from 1:1 to 15:1, most preferably from 2:1 to 12:1.

In the catalyst or catalyst precursor the molar ratio of Mg:Ti may be from 1:1 to 20:1, preferably from 2:1 to 12:1, most preferably from 3:1 to 10:1. The molar ratio of second aluminum ($Al^2$) to titanium in the catalyst may be from 1:1 to 8:1, preferably from 1.5:1 to 7:1, most preferably from 2:1 to 6:1. Generally, from 0 to not more than about 70 weight %, preferably from 10 to 60 weight %, of the aluminum (compound in the catalyst) may be used to treat the support (e.g. $Al^1$). The molar ratio of active halide (from the reactive organic halide) to Mg may be from preferably 1.5:1 to 5:1, more preferably from 1.5:1 to 3:1, most preferably from 1.9:1 to 3:1. The molar ratio of electron donor, if present, to Ti may be from 0.5:1 to 18:1, preferably from 1:1 to 15:1. most preferably from 2:1 to 12:1. The molar ratio of total Al:Mg in the catalyst or catalyst precursor may be from 0.35:1 to 3:1, preferably from 0.4:1 to 2:1.

In a preferred embodiment there is provided a process conducted in a hydrocarbon solvent at a temperature from 0° C. to 100° C. for preparing a catalyst in which the order of chemical addition is important, for the gas phase polymerization of alpha-olefins comprising:

(a) contacting a dehydrated silica support containing from 0.5 to 2.5 weight % aluminum having the formula $R^1{}_b Al(OR^1)_a X_{3-(a+b)}$ wherein a is an integer from 0 to 3 preferably 0 or 1, b is an integer from 0 to 3, preferably 2 or 3, most preferably 3, and the sum of a+b is from 0 to 3, preferably 3, $R^1$ is the same or different $C_{1-10}$ alkyl radical, X is selected from the group consisting of Cl and Br preferably Cl; with (b) a magnesium compound of the formula $Mg(R^5)_2$ wherein each $R^5$ is independently selected from the group consisting of $C_{1-8}$ alkyl radicals and may contain an aluminum alkyl as a thinning agent, to provide from 0.25 to 8.0 weight % of Mg based on the weight of the silica, contacting the resulting product; with (c) a reactive organic halide selected from the group consisting of $CCl_4$ and $C_{3-6}$ secondary and tertiary alkyl chlorides or a mixture thereof to provide a Cl:Mg molar ratio from 1.5:1 to 3:1 in the resulting product; and contacting the resulting product; with (d) an aluminum compound of the formula $R^1_b Al(OR^1)_a X_{3-(a+b)}$ wherein a is an integer from 0 to 3, preferably 0 or 1, b is an integer from 0 to 3, preferably 2 or 3, most preferably 3, and the sum of a+b is from 0 to 3, preferably 3, $R^1$ is the same or different $C_{1-10}$ alkyl radical, X is selected from the group consisting of a chlorine or bromine atom, preferably chlorine, to provide a molar ratio of Al (from the second aluminum addition (e.g. $Al^2$):Ti from 1:1 to 8:1;

(e) optionally an electron donor in an ED:Ti ratio from 0:1 to 18:1. The electron donor may be selected from the group consisting of $C_{3-18}$ linear or cyclic aliphatic or aromatic ethers, ketones, ester, aldehydes, amides, esters, nitriles, amines, phosphines, or siloxanes. Preferably, the electron donor is selected from the group consisting of diethyl ether, triethyl amine, 1,4-dioxane, tetrahydrofuran, acetone, ethyl acetate, and cyclohexanone and mixtures thereof. The electron donor may be used in a molar ratio to the titanium from 0:1 to 18:1, preferably from 0.5:1 to 15:1, more preferably from 1:1 to 15:1 and most preferably from 2:1 to 12:1, (f) a titanium compound of the formula $Ti(OR^2)_c X_d$ wherein $R^2$ is selected from the group consisting of a $C_{1-4}$ alkyl radical, and a $C_{6-10}$ aromatic radical, X is selected from the group consisting of a chlorine atom and a bromine atom, preferably a chlorine atom, c is 0 or an integer up to 4 and d is 0 or an integer up to 4 and the sum of c+d is the valence of the Ti atom, preferably 3 or 4, to provide from 0.20 to 3 weight % of Ti based on the final catalyst.

The order of carrying out b through f is dependent on the criteria listed above being met. There are 120 different ways in which to produce a catalyst using the above five compounds (e.g. for any given 5 components assuming the treated silica is always added first, they may be mixed in 120 different ways). However, by employing the above restrictions, only 24 are allowed. Without being tied to any theories, even limiting the catalyst synthesis to the above criteria will likely produce a number of catalysts that show low productivity and hence have limited commercial applicability. Thus, productivity is a limitation to limit the number of catalyst formulations that proves to be useful. The preferred productivity criteria is that the catalyst has a productivity of greater than 1,500 grams of polymer per gram of catalyst (g/g) under standard commercial plant operations such as for an ethylene hexene copolymer having an MI of 1 and a density of 0.918. The conditions of operation of a plant to produce a resin having a melt index (MI) of 1 as determined by ASTM D 1238-04 and a density of 0.918 g/cc as determined by ASTM D 792-00 are well known to those skilled in the art. However, if the productivity of a catalyst is below 1,500 g of polymer/g of catalyst due to the poor selection of components and or loading levels this does not mean that a particular synthesis order is poor. It may simply mean that another formulation is required to obtain a usable catalyst when synthesizing using a particular order of addition. For example, if the halide (preferably Cl):Mg molar ratio is 1.5 in the above synthesis some of the possible 24 combinations may produce a catalyst with low productivity. However, if the halide (preferably Cl):Mg molar ratio is 3, then it is highly likely that all of the above 24 combinations would produce an active catalyst. Following the above criterion, one of ordinary skill in the art, may, by routine non-inventive experimentation, determine appropriate components, loadings and sequence following the teachings of the present invention.

One needs to consider that the ideal catalyst of choice may be selected by the user to provide the best product for the lowest cost. However, in general there are three distinct user groups: polyethylene manufacturers, polyethylene converters and polyethylene consumers, and their criteria for success may not always be aligned. For example it is likely that everyone wants the best product for the least cost. However, the manufacturer may want to maximize plant throughput by increasing the flowability of the granular resin through the plant or by increasing the MWD to increase throughput through an extruder. Manufacturers may also choose to increase bulk density to increase the speed at which product can be discharged from the reactor. Alternately, manufacturers may want to reduce the need for a costly co-catalyst such as trimethyl aluminum and instead use triethyl aluminum. To limit capital costs, losses to flare or reduce the amount of co-monomer being recycled, manufacturers may also want a catalyst that requires low levels of co-monomer to ethylene in the reactor. Then again, manufacturers may want a catalyst with high productivity to reduce the amount they spend on catalyst. Converters will want to maximize throughput in their extruders and want broad MWD products without the loss of polymer physical properties. Hexane extractables may be important to a converter such that the products they make pass specific FDA regulations. Consumers on the other hand will want tough products in applications such as garbage bags and therefore may require high dart impact strength and machine direction (MD) tear strength. On the other hand, others may prefer sticky resin for stretch wrapping products. In summary, the ideal catalyst is dependent on the end user group and thus there can be many preferred catalysts. From a manufacturers perspective it would be best to have one catalyst fit all. However, from a user's perspective one generally prefers to have specific areas addressed. For any given product, while one manufacturer wants a high productivity catalyst, another may want a catalyst that delivers a product with low hexane extractables, or high bulk density. These requests can now be fulfilled.

One general synthetic procedure which follows the above criteria could be written as follows: treated silica is added to a reaction vessel and treated concurrently with the following, with or without isolation, butyl ethyl magnesium, t-butyl chloride, tetrahydrofuran, titanium tetrachloride, and trioctyl aluminum prior to drying to produce a free flowing powder. This is one of the acceptable orders as defined above. The catalyst or catalyst precursor is fed to the reactor, generally above a distributor plate into the bed of growing polymer particles using a metering device. One such device is disclosed at Col. 8 lines 15-20 of U.S. Pat. No. 4,543,399 issued Sep. 24, 1985 to Jenkins III et al. assigned to Union Carbide Corporation (which references U.S. Pat. No. 3,779,712 issued Dec. 18, 1973 to Calvert et al., assigned to Union Carbide Corporation). The co-catalyst, typically a tri $C_{1-8}$ alkyl aluminum (in neat form or in a solution diluted with a hydrocarbon solvent) is also fed to the bed of growing polymer particles using a liquid metering device. Such devices are known in the art.

The co-catalyst may be selected from the group consisting of tri $C_{1-8}$ alkyl or alkenyl aluminums, alkyl aluminum chlorides (e.g. di $C_{1-8}$ alkyl aluminum chloride), and mixtures thereof. This includes trimethyl aluminum, triethyl aluminum, tripropyl aluminum, tributyl aluminum, triisobutyl aluminum, diethyl aluminum ethoxide, diisobutyl aluminum ethoxide, isoprenylaluminum, tri-n-hexyl aluminum, tri-octyl aluminum, diethyl aluminum chloride, dibutyl aluminum chloride, and mixtures thereof. A preferred co-catalyst is triethyl aluminum. While the aluminum halides might be useful in accordance with the present invention they increase the amount of halide in the polymer resulting in increased consumption of additives to neutralize and stabilize the resulting polymer and are therefore not preferred.

The co-catalyst may be fed to the reactor to provide from 10 to 100, preferably, 10 to 50, more preferably 16 to 50 most preferably from 17 to 30, desirably from 20 to 26 ppm of aluminum (Al ppm) based on the polymer production rate. Such a process is more fully described in Canadian Patent Application 2,397,401 laid open Feb. 20, 2003 (the text of which is hereby incorporated by reference). In some instances by using the Al ppm control technique the resin stickiness may be reduced and productivity increased up to about 20%. Also the variability in resin properties and process control parameters including melt index, density, hexane extractables, hydrogen and co-monomer response may be reduced by up to 50%.

In the reactor the gas phase typically comprises the monomers, a balance gas such as nitrogen, a molecular weight control agent such as hydrogen, and depending on the process possibly a condensable liquid (i.e. condensing mode such as disclosed in U.S. Pat. Nos. 4,543,399 issued Sep. 24, 1985 to Jenkins III et al.; 4,588,790 issued May 15, 1986 to Jenkins III et al.; and the so-called super condensing mode as disclosed in U.S. Pat. No. 5,352,749 issued Oct. 4, 1994 to DeChellis et al., assigned to Exxon Chemical Patents, Inc. and U.S. Pat. No. 5,436,304 issued Jul. 25, 1995 to Griffen et al., assigned to Exxon Chemical Patents, Inc.).

The reactor mixture preferably comprises from 0 to 60 mole % hydrogen, from 5 to 35 mole % of one or more butene, from 95 to 65 mole % of ethylene and from 0 to 75 mole % of an inert gas such as $N_2$. The copolymer may have a density from 0.905 to 0.960 g/cc, typically from about 0.910 to about 0.940 g/cc.

Triethyl aluminum may be used as a co-catalyst in amounts from 10 to 100 ppm Al based on the polymer production rate, preferably from 10 to 50, more preferably from 16 to 50 Al ppm most preferably from 17 to 30 Al ppm, desirably from 20 to 26 Al ppm.

Fluidized bed gas phase reactors to make polyethylene are generally operated at temperatures from about 50° C. up to about 125° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

The polymer should have a molecular weight (weight average, Mw) greater than 50,000. The polymers prepared according to the present invention will have a polydispersity (Mw/Mn) from 2.5 to 5, preferably from 3 to 4.

The resulting polymers may be used in a number of applications such as film extrusion, both cast and blown film extrusion and both injection and rotomolding applications. Typically the polymer may be compounded with the usual additives including heat and light stabilizers such as hindered phenols; ultra violet light stabilizers such as hindered amine light stabilizers (HALS); process aids such as fatty acids or their derivatives and fluoropolymers optionally in conjunction with low molecular weight esters of polyethylene glycol.

The present invention will now be illustrated by the following non-limiting examples.

In the examples the following abbreviations are used:
BEM is Butyl ethyl magnesium;
THF is tetrahydrofuran;
TnOAL is tri (normal) octyl aluminum;
$TiCl_4$ is titanium tetrachloride;
t-BuCl is tertiary butyl chloride;
THAL is trihexyl aluminum; and
TEAL is triethyl aluminum.

EXAMPLE 1

Catalyst Preparation

The catalysts used in this invention are prepared in accordance with the procedures described in U.S. Pat. No. 7,211,535 (Kelly et al.).

The specific catalyst used in this example is prepared in the manner used to prepare catalyst 11 of the patent, except that THAL was used as the alkyl aluminum in this catalyst (as opposed to TnOAL which was used to prepare catalyst 11 of the aforementioned patent). For convenience, a brief summary of the lab scale synthesis is provided below.
1. The catalyst support—silica—is initially dehydrated (using conventional dehydration techniques, such as described in U.S. Pat. No. 6,140,264).
2. A slurry of 30 g of the silica in hydrocarbon solvent (pentane) was then prepared.
3. TEAL was added to the slurry of silica (0.735 g TEAL, 0.016 moles).
4. The catalyst components were then added in the following order:
    4.1 BEM (21 g, 0.038 moles); followed by
    4.2 t-BuCl (7.1 g, 0.077 moles); followed by
    4.3 $TiCl_4$ (0.9 g, 0.0047 moles); followed by
    4.4 THF (3.07 g, 0.43 moles); followed by
    4.5 THAL (0.02 6 moles) instead of the TnOAL used in Example 11 of the aforementioned Kelly et al. patent.

EXAMPLE 2

Comparative-Polymerization

Catalyst prepared according to example 1 was used in technical scale polymerizations in a stirred bed polymerization reactor having a nominal value of 75 liters in the manner described at example 24 of the aforementioned Kelly et al. '535 patent.

In addition, catalyst prepared according to example 1 was also used in a commercial scale, gas phase polymerization reactor.

Ethylene-butene copolymerizations were completed using both reactors. In both cases, the reactor conditions were optimized to maximize the productivity of the reactor using conventional engineering practices. For clarity, reactor productivity is maximized when the largest amount of polyethylene is produced in a given period of time—for example, a reactor productivity of 22 tonnes per hour is 10% greater than a reactor productivity of 20 tonnes per hour.

Ethylene-butene copolymers having a melt index ("MI" or "$I_2$"), aiming point of about 1 grams per ten minutes and a density aiming point of about 0.92 g/cc were prepared according to conditions for maximum reactor productivity in the reactor. The short chain branching distribution of these resins was analyzed by Gel Permeation Chromatography ("GPC")—Fourier Transform Infra Red ("FTIR"), or "GPC-FTIR" to characterize the short chain branching distribution as a function of molecular weight. The GPC-FTIR method combines two techniques that are well known to those skilled in the art. The molecular weight distribution is determined by GPC and the comonomer content is determined by FTIR. The results from the analysis are provided as plots (of SCB as a function of molecular weight) as shown in FIGS. 1 and 2.

A typical GPC-FTIR profile for these resins is shown in FIG. 1 (prior art). An examination of the GPC-FTIR profile of FIG. 1 shows that the level of SCB is quite flat between molecular weights of about 30,000 to 300,000—i.e. the number of SCB per 1000 carbon atoms is approximately the same for the polymer fractions between these molecular weights.

EXAMPLE 3

FIG. 2 provides a GPC-FTIR profile of an etylene-butene resin that was prepared in accordance with the method of this invention. The melt index and density aiming points were the same as those for the comparative resin described above—i.e. an $I_2$ of 1 g/10 minutes and a density of 0.920 g/cm³. The ethylene-butene resin was produced in a commercial reactor (as above) but the reactor conditions were sub-optimal. In particular, the reactor residence time was increased by about 15%-20% in comparison to the minimum/optimal residence time used to produce the polymers shown in FIG. 1.

An examination of the GPC-FTIR profile shown in FIG. 2 shows that the ethylene-butene resins produced in accordance with the method of this invention have a comparatively larger amount of SCB at low molecular weight (e.g. greater than 20 SCB per 1000 carbon atoms at log molecular weight 4) and a comparatively lower amount of SCB at higher molecular weight (e.g. about 17 SCB per 1000 carbon atoms at log molecular weight 5.5). This type of SCB distribution is typical of ethylene-butene copolymers using "old" Z/N catalysts (such as the Z/N catalysts described in the aforementioned U.S. Pat. No. 4,302,586; Karol et al.). These resins can be "stickier" than the resins of example 2 (FIG. 1): while not wishing to be bound by theory, it is believed that the higher level of SCB in the low molecular weight fraction contributes to stickiness. This "stickiness" characteristic may be desirable for some film applications (especially for the preparation of so called "cling wrap").

For clarity, neither of the resin compositions shown in FIG. 1 or FIG. 2 is novel per se. The method of this invention allows both types of resins to be produced using the same type of catalyst by adjusting the residence time of the polymer reactor.

INDUSTRIAL APPLICABILITY

The process of this invention enables the preparation of a large variety of ethylene copolymers in a single type of gas phase polymerization reactor. The ethylene copolymers that are produced by this invention are suitable for a many different uses and are especially suitable for the preparation of films.

The invention claimed is:
1. A method to control the short chain branching distribution of a thermoplastic ethylene-butene copolymer having a density of from 0.910 to 0.935 g/cc, said method comprising:
   1) establishing a first steady state gas phase polymerization condition wherein a gaseous monomer mixture be comprising from 5 to 35 mole % butene and, to 100 mole %, from 95 to 65 mole % ethylene, is contacted with a supported polymerization catalyst in a gas phase polymerization reactor at a pressure of from 10 to 500 psi; a temperature of from 50 to 125° C. and a first reaction residence time;
   2) establishing a second steady state gas phase polymerization condition under which:
      2.1) said gaseous monomer mixture is essentially the same as said first polymerization condition;
      2.2) said supported polymerization catalyst is essentially the same, as used in said first polymerization condition; and
      2.3) a second residence time is employed, wherein said second residence time is greater than the first residence time;

wherein the short chain branching content of the ethylene-butene copolymer prepared under said second polymerization condition is different from the short chain branching content of the ethylene-butene copolymer prepared under said first polymerization condition, characterized in that the low molecular fraction of the ethylene butene copolymer produced under said second polymerization condition has a higher short chain branch content than ethylene butene copolymer that is produced under said first polymerization condition and wherein said polymerization catalyst is prepared according to a process comprising contacting at a temperature from 0° C. to 100° C. a support which has been heat treated to remove adsorbed water and having a residual surface hydroxyl content from 0.1 to 5 mmol/g of support, which support has been subsequently treated with an aluminum compound reactive with the surface hydroxyl groups to provide from 0.5 to 2.5 wt % Al on the support, in an inert hydrocarbyl solvent or diluent with or without isolation of the treated support from the hydrocarbyl solvent or diluent with: a transition metal compound, a magnesium halide, prepared by reacting in situ an alkyl magnesium compound of the formula $(R^5)_e Mg X_{2-e}$ wherein each $R^5$ is independently a $C_{1-8}$ alkyl radical and e is 1 or 2 and X is a chlorine or bromine atom; with a reactive organic halide selected from the group consisting of $CCl_4$ and $C_{1-6}$ alkyl halides and mixtures thereof, a second aluminum alkyl compound and optionally an electron donor and separating the resulting catalyst from the inert hydrocarbyl solvent or diluent provided that the order of reagent addition to the support meets the following conditions:
   (i) the transition metal compound cannot be added first;
   (ii) when the Mg compound is added first, the transition metal compound cannot be added second;
   (iii) when the second aluminum alkyl is added first, the transition metal compound cannot be added second;
   (iv) when the Mg compound and the second aluminum alkyl compound are added first and second, in any order, the transition metal compound cannot be added third;
   (v) the transitional metal compound must be added after the reactive organic halide;
   (vi) the transition metal compound must be added after the alkyl magnesium compound;
   (vii) the electron donor, if present, cannot be added last;
   (viii) the reactive organic halide cannot be added last;
   (ix) if the reactive organic halide is first the second aluminum alkyl compound cannot be second;
   (x) if the second aluminum alkyl compound is first the reactive organic halide cannot be second; and
   (xi) when the transition metal is last, the second aluminum alkyl and Mg compounds cannot be third or fourth, in any order.

2. The method according to claim 1, wherein the aluminum compound used to treat the support and the second aluminum compound in the catalyst are independently of the formula $R^1{}_b Al(OR^1)_a X_{3-(a+b)}$ wherein a is an integer from 0 to 3, b is an integer from 0 to 3 and the sum of a+b is from 0 to 3, $R^1$ is the same or different $C_{1-10}$ alkyl radical.

3. The method according to claim 2, wherein in the catalyst the transition metal compound has the formula $Ti(OR^2)_c X_d$ wherein $R^2$ is chosen from a $C_{1-4}$ alkyl radical, and a $C_{6-10}$ aromatic radical, X is chosen from a chlorine atom and a bromine atom, c is 0 or an integer up to 4 and d is 0 or an integer up to 4 and the sum of c+d is the valence of the Ti atom; the magnesium compound has the formula $(R^5)_e Mg X_{2-e}$ wherein each $R^5$ is independently a $C_{1-8}$ alkyl radical and e is 1 or 2 and X is a chlorine or bromine atom; the reactive organic halide is chosen from $CCl_4$, $C_{3-6}$ secondary and tertiary alkyl halides, and mixtures thereof and optionally an electron donor, said catalyst having a molar ratio of total Al to Ti from 2:1 to 15:1; a molar ratio of Al from the second aluminum component ($Al^2$): Ti from 1:1 to 8:1 a molar ratio of Mg:Ti from 1:1 to 20:1; a molar ratio of active halide from the alkyl halide to Mg from 1:1 to 6:1; a molar ratio of electron donor to Ti from 0:1 to 18:1 and the titanium is present in the catalyst in an amount from 0.20 to 3.0 weight % inclusive of the support.

4. The method according to claim 3, wherein the catalyst is activated with one or more co-catalyst of the formula $R^1{}_b Al(OR^1)_a X_{3-(a+b)}$ wherein a is either 0 or 1, b is either 2 or 3 and the sum of a+b is up to 3, $R^1$ is the same or different $C_{1-10}$ alkyl radical, X is a chlorine atom, in an amount to provide from 10 to 100 ppm of aluminum from the co-catalyst based on the polymer production rate.

5. The method according to claim 4, wherein in the catalyst the molar ratio of total Al ($Al^1+Al^2$):Ti is from 4:1 to 10:1.

6. The method according to claim 5, wherein in the catalyst the molar ratio of Mg:Ti is from 2:1 to 12:1.

7. The method according to claim 6, wherein in the catalyst the titanium component is selected from the group consisting of $TiCl_4$, $Ti(OC_4H_9)_4$, $Ti(OC_3H_7)_4$ and mixtures thereof.

8. The method according to claim 7, wherein in the catalyst the aluminum compound is selected from the group consisting of trimethyl aluminum, triethyl aluminum, diethyl aluminum ethoxide, diisobutyl aluminum ethoxide, tri iso-butyl aluminum, isoprenyl aluminum, tri-n-hexyl aluminum, tri-n-octyl aluminum, diethyl aluminum chloride and mixtures thereof.

9. The method according to claim 8, wherein in the catalyst the magnesium compound is selected from the group consisting of dibutyl magnesium, butyl octyl magnesium and butyl ethyl magnesium, the reactive alkyl halide is present in an amount to provide a molar ratio of active halogen:Mg from 1.5:1 to 3:1.

10. The method according to claim 9, wherein in the catalyst the reactive alkyl halide is a $C_{3-6}$ secondary or tertiary alkyl chloride.

11. The method according to claim 10, wherein the electron donor is present and is chosen from $C_{3-18}$ linear, cyclic, aliphatic and aromatic ethers, ketones, esters, aldehydes, amides, nitriles, amines, phosphines and siloxanes.

12. The method according to claim 11, wherein the support is an inorganic support having an average particle size from about 10 to 150 microns, a surface area greater than 100 m$^2$/g, a pore volume from about 0.3 to 5.0 ml/g, and a surface hydroxyl content from about 0.1 to 5 mmol/g of support.

13. The method according to claim 12, wherein the electron donor is present in an amount to provide a molar ratio of electron donor to the titanium from 2:1 to 12:1.

14. The method according to claim 13, wherein the electron donor is selected from the group consisting diethyl ether, triethyl amine, 1,4-dioxane, tetrahydrofuran, acetone, ethyl acetate, and cyclohexanone and mixtures thereof.

15. The method according to claim 14, wherein in the catalyst from 0 to 70 weight % of the aluminum compound of the formula $R^1{}_b Al(OR^1)_a X_{3-(a+b)}$ wherein a is either 0 or 1, b is either 2 or 3 and the sum of a+b is up to 3, $R^1$ is the same or different $C_{1-10}$ alkyl radical and X is Cl, is used to treat the support and the aluminum content on the support is included in the ratio of total Al:Ti in the catalyst.

16. The method according to claim 15, wherein from 30 to 100 weight % of the aluminum compound in the catalyst is added at some point during the catalyst synthesis.

17. The method according to claim 16, wherein the titanium compound is selected from the group consisting of $Ti(OC_4H_9)_4$ and $TiCl_4$ and mixtures thereof.

18. The method according to claim 17, wherein in the catalyst the Ti is present in an amount from 0.20 to 3.0 weight % inclusive of the support.

19. The method according to claim 18, wherein the co-catalyst is triethyl aluminum.

* * * * *